Nov. 27, 1962 R. D. McKECHNIE 3,065,477
UPHOLSTERY CLEANING MACHINE
Filed July 11, 1961
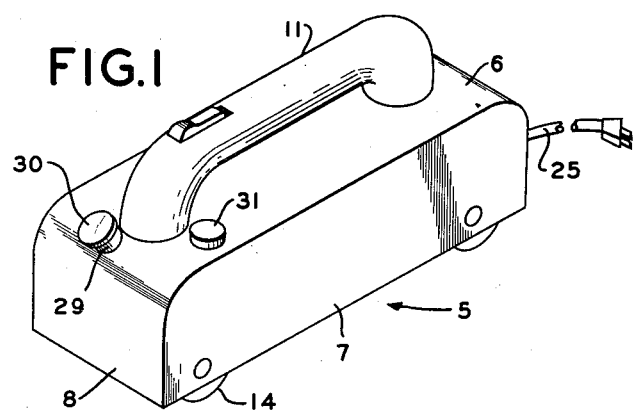
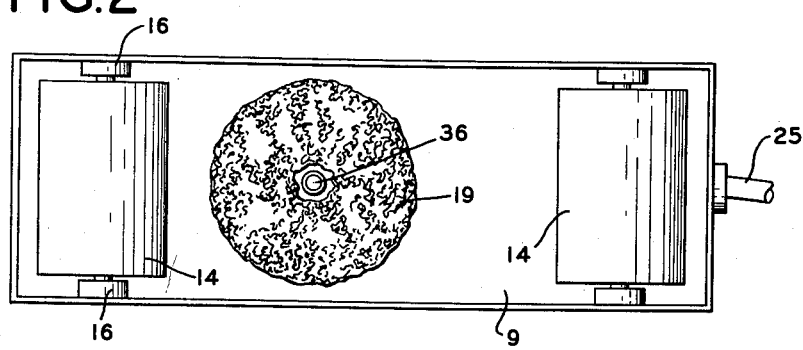
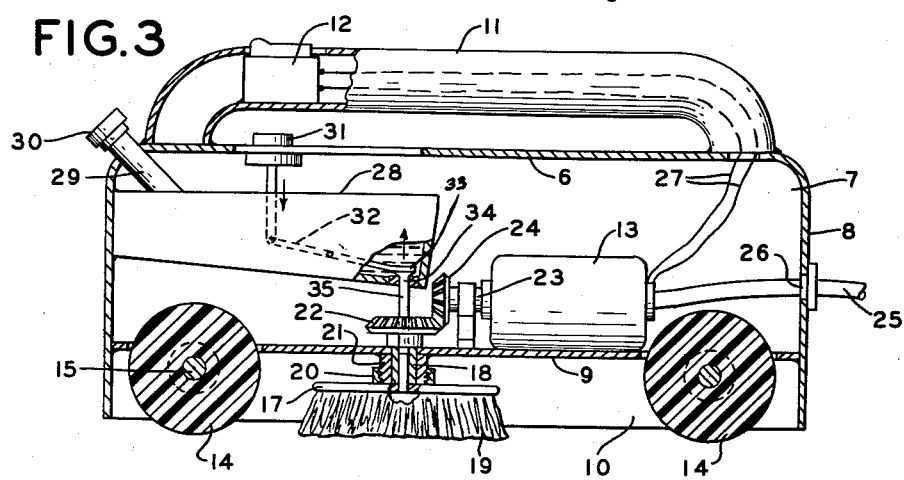
INVENTOR.
RICHARD D. MC KECHNIE

United States Patent Office 3,065,477
Patented Nov. 27, 1962

3,065,477
UPHOLSTERY CLEANING MACHINE
Richard D. McKechnie, 9715 NE. 3rd St.,
Vancouver, Wash.
Filed July 11, 1961, Ser. No. 123,239
1 Claim. (Cl. 15—29)

This invention relates generally to electrically operated cleaning devices, and more specifically to a compact apparatus for cleaning upholstery, rugs, carpets and like fabrics.

There is a distinct need in the home for a small compact cleaning machine for use on upholstery and like materials. At present it is necessary to hire professional services for such purposes, and the commercial equipment used is entirely unsuitable from the standpoint of both cost and size, for general home requirements.

It is therefore a primary object of this invention to provide a compact power operated cleaning machine which is designed for retail as a home appliance to enable the cleaning of upholstery and like materials in a simple and efficient manner.

It is a further object of this invention to provide a compact power operated cleaning machine for the purposes above set forth which is of robust construction, and incorporates a solvent dispensing device for controlled application to a motorized rotating brush.

Briefly, the invention involves the provision of a casing which mounts two spaced rollers for engagement with the material to be cleaned. Disposed intermediate the rollers is an electrically powered rotating brush which rotates in the plane of the rollers. The casing has a handle which incorporates a switch for controlling the electric motor, and is further provided with a solvent storage container adapted for dispensing the desired amount of solvent into the brush as required.

A full understanding of the details of the invention, together with further advantages, will become apparent by reference to the following detailed description of a preferred embodiment thereof, taken in conjunction with the attached drawings wherein:

FIG. 1 is a perspective view of the cleaning machine which comprises my invention.

FIG. 2 is an underside view of the machine showing the relationship of the rollers and the rotating brush.

FIG. 3 is a side elevation of the machine shown partly in cross section.

Similar reference characters indicate corresponding parts throughout the several views in the drawings.

Referring now to the drawings in detail, the numeral 5 represents a substantially rectangular casing having a top 6, opposed parallel side walls 7 and end walls 8. A flat base 9 closes the underside of the casing and is disposed in a vertically spaced manner above the lower edges of the side walls 7 and end walls 8, so as to provide a peripheral skirt 10. A tubular handle 11 extends along the top 6 of the casing and mounts an electrical switch 12 in the forward end, for controlling an electric motor 13 mounted on the base 9 within the casing.

Two rollers 14 are rotatably mounted in the skirt 10 at each end of the casing, and are supported on axles 15 which locate in bearing bosses 16 secured to the inner sides of the skirt. A circular brush 17 is mounted on a hollow shaft 18 which projects normally through the base intermediate the rollers 14. The brush is provided with downwardly extending nylon bristles 19, and is removably secured to the shaft by means of a threaded collar 20. The shaft rotates in a sleeve 21 which projects beneath the base and terminates inwardly of the casing with a bevel gear 22. The electric motor 13 has a shaft 23 which mounts a second bevel gear 24 for meshing with the gear 22 in a conventional manner. A power cord 25 communicates with the motor through a hole 26 formed in the end wall 8 and is connected in series with the motor through the switch 12 and wires 27.

A solvent storage container 28 is mounted within the casing towards the forward end and is provided with a filling pipe 29 and closure cap 30 which projects outwardly and upwardly through the forward end of the casing. A solvent dispensing button 31 is mounted on the top 6, adjacent the handle, and is adapted to pivotally actuate a lever 32 disposed within the container. The lever terminates with a valve 33 which closes over an opening 34 formed in the bottom of the container. A short pipe 35 connects the opening 34 with the hollow shaft 18 such that solvent may be disposed therethrough for selective application through a hole 36 formed in the centre of the brush.

The operation of the machine will be apparent to the reader, the brush being applied to the surface to be cleaned and moved with controlled pressure on the supporting rollers. The skirt provides an effective protection for preventing solvent from being sprayed beyond the area being worked.

Having described the invention in a preferred form, it will be appreciated that some modifications may be made to the precise configuration, without departing from the scope or spirit of the invention, as defined by the following claim.

I claim:

An upholstery cleaning machine, comprising, a casing, said casing having sides surrounding a base and extending therebeneath to form a peripheral skirt, rollers mounted between opposite sides of the casing and projecting through the base and below the lower edge of the skirt, a circular brush mounted for rotation within a plane extending parallel to said base upon a hollow shaft extending perpendicularly through said base, said circular brush being mounted intermediate the rollers to the underside of the base and surrounded by the skirt, power means for rotating the shaft, a solvent container mounted within the casing and having an opening formed therein communicating with the hollow shaft for dispensing solvent into the brush, the upper end of said hollow shaft defining an upwardly flared valve seat for receiving solvent from said container, a valve member normally engaged with said valve seat for blocking flow of said solvent through said shaft, a handle mounted on the top of the casing, means mounted on the handle for controlling the rotation of the brush, and a dispensing button mounted on the casing for disengaging said valve member from said valve seat and thereby controlling the flow of solvent into the brush.

References Cited in the file of this patent

UNITED STATES PATENTS

| 1,007,888 | Parker | Nov. 7, 1911 |
| 1,110,929 | Hammond | Sept. 15, 1914 |
| 1,175,723 | Dohn | Mar. 14, 1916 |
| 1,622,182 | Cowan | Mar. 22, 1927 |
| 1,867,896 | Soss | July 19, 1932 |
| 2,912,706 | Gerecke et al. | Nov. 17, 1959 |

FOREIGN PATENTS

| 194,037 | Germany | Dec. 27, 1957 |
| 369,809 | Germany | Feb. 23, 1923 |
| 470,328 | Italy | Apr. 2, 1952 |
| 800,063 | Great Britain | Aug. 20, 1958 |